C. S. ASH.
WIRE WHEEL.
APPLICATION FILED AUG. 10, 1918.

1,314,381. Patented Aug. 26, 1919

INVENTOR
C. S. Ash
BY
Duell, Warfield & Duell
ATTORNEY

UNITED STATES PATENT OFFICE.

CHARLES S. ASH, OF GENEVA, NEW YORK.

WIRE WHEEL.

1,314,381.   Specification of Letters Patent.   Patented Aug. 26, 1919.

Application filed August 10, 1918. Serial No. 249,277.

*To all whom it may concern:*

Be it known that I, CHARLES S. ASH, a citizen of the United States, residing at Geneva, in the county of Ontario and State of New York, have invented certain new and useful Improvements in Wire Wheels, of which the following is a full, clear, and exact description, such as will enable others skilled in the art to which it appertains to make and use the same.

This invention relates to vehicle wheels, and more particularly to the inner hub and associated parts of quick-detachable wheels adapted for mounting on axles of the full floating type.

One of the objects of the invention is to provide a simple and rugged construction of driving hub for axles of the character mentioned wherein the permanent symmetry of all portions subjected to bearing strain is insured.

Other objects and advantages will be in part obvious and in part noted hereinafter in connection with the following description of the accompanying drawing, which illustrates a preferred embodiment of the invention, and in which—

Figure 1:
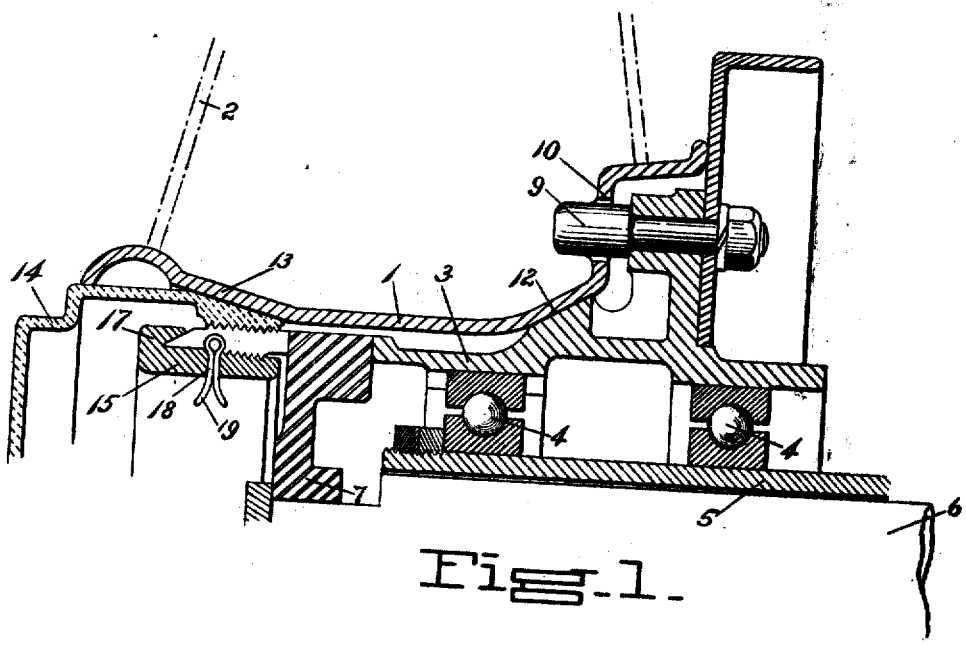
Figure 1 is a partial central sectional view of an inner and outer hub assembled on a driving axle of the full floating type.
Figure 3:
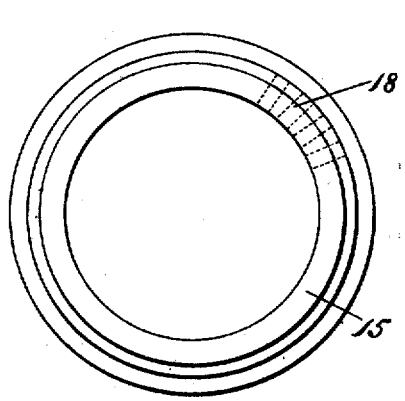
Figure 2:
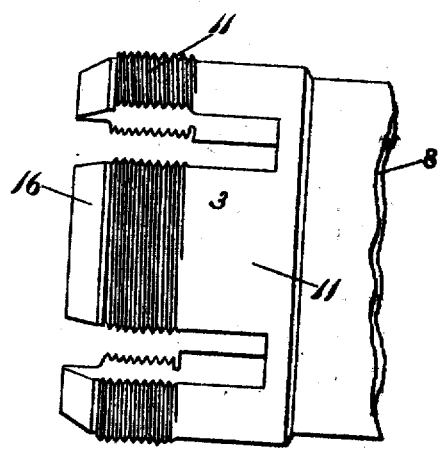
Fig. 2 is a broken side view showing the outer end of the inner hub.

Fig. 3, an end view of a reinforcing nut for the inner hub.

The construction shown comprises in general an outer hub 1 connected by spokes 2 or otherwise with a tire-carrying rim (not shown) and adapted for removably fitting over an inner driving hub 3. The latter is supported through bearings 4 on the housing 5 about a driving axle 6 and receives power from the latter by means of a spider driving dog 7 clutched on the axle and clutching with the slotted end 8 of the inner hub. A rotary interlock between the inner and outer hubs is conveniently effected by driving pins 9 on the former projecting through complementary apertures 10 in the latter.

Referring more particularly to the drawing, the inner hub 3 is elongated and slotted or furcated axially at its outer end to provide a plurality of teeth 11 between which the arms of a driving dog 7 are received, the latter being clutched or keyed to the driving axle 6. It may be noted that the outer hub 1 is provided adjacent its inner end with a conical inner bearing surface 12 which seats against a corresponding and opposed surface of the inner hub for support and alinement of the two at this point. The outer hub is likewise provided, adjacent its outer end, with an inclined bearing surface 13, against which, when the parts are assembled, is wedged the corresponding and opposed surface of a cap nut 14 threaded internally to screw on the teeth or prongs 11 for preventing axial displacement of the outer hub and for supporting the latter adjacent its outer end.

In order to reinforce the slotted end 8 of the inner hub (necessarily weakened by the slots), the teeth 11 are internally threaded, and a circumferentially continuous reinforcing means, constituted in the present embodiment by nut 15, is employed to screw within the slotted end 8 and thereby stiffen the teeth. Further, in the preferred form, teeth 11 are beveled at the edge 16 and nut 15 is provided with a head 17 correspondingly under-cut and beveled and thereby providing a recess within which the beveled edge 16 is received when the nut is screwed home. By the coaction of the inclined surfaces described, it will be noted that nut 15, when mounted, acts as well to effect concentricity of the teeth as to maintain such concentricity, and that the nut as a whole strongly reinforces the teeth against either separate distortion or common bending. The nut also serves, preferably, as a retaining stop to hold floating axle 6 in position.

The nut 15 may be conveniently provided with a series of radial apertures 18, in one of which, when exposed between teeth 11, a cotter pin 19 may be fitted to prevent reverse rotation.

By the construction and assembly described the outer end of the inner hub, in the plane of support of the outer bearing 13 of the wheel, is materially reinforced to a degree commensurate with the integral, that is circumferentially continuous, inner bearing wall supporting the inclined surface 12 of the outer hub. Furthermore, the wedging action of the nut 15 insures permanent alinement of the hubs and also strengthens the teeth 11 against displacement due to the rotary driving force transmitted through the arms of dog 7. Due to the relative diameters of the parts, it is of course intended that nut 15 will not interfere with quick removal of the cap nut 14 and the outer hub.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. In a quick-detachable wheel, in combination, an inner hub having its outer end furcated to provide teeth between which complementary driving arms may be received, said teeth having external threads to receive a cap nut, and means engaging the inner surface of said teeth to maintain concentricity thereof and reinforce the same.

2. In a quick-detachable wheel, in combination, an inner hub having its outer end furcated to provide teeth between which complementary driving arms may be received, said teeth having external threads to receive a cap nut, and circumferentially continuous means engaging the inner surface of said teeth to maintain concentricity thereof and reinforce the same.

3. In a vehicle wheel, in combination, an inner hub having its outer end furcated to provide teeth between which complementary driving arms may be received, said teeth having interior threads, and a threaded nut to screw within said teeth and having a portion to grip the same for effecting and maintaining concentricity thereof and for reinforcing the same against distortion.

4. In a vehicle wheel, in combination, an inner hub for mounting on an axle of the full floating type, said hub having its outer end furcated to provide teeth for clutching with driving arms on the axle, said teeth having exterior threads to receive a cap nut and having interior threads and an exterior edge bevel, and a circumferentially continuous externally threaded nut to screw within said teeth and having an acute recess to receive and coact with said edge bevel for effecting and maintaining concentricity of said teeth and for reinforcing the same.

5. In a quick-detachable wheel, in combination, an inner hub having its outer end furcated to provide teeth between which complementary driving arms may be received, said teeth having external threads to receive a cap nut, and circumferentially continuous means engaging the inner surface of said teeth to maintain concentricity thereof and reinforce the same, said means having a plurality of circumferentially spaced radial apertures wherein a locking pin may be fixed to prevent reverse rotation.

6. In a wheel, an inner hub having its outer end axially slotted to provide a plurality of prongs between which complementary arms of a driving dog may be seated, said prongs having exterior and interior threads and a beveled outer edge, a tubular nut having exterior threads to engage the interior threads of said prongs and having an under-cut outer end to wedge against said beveled edge for reinforcing said teeth and maintaining concentricity thereof, an outer hub to fit removably over said inner hub and having an exterior inclined surface adjacent its outer end, and a cap nut having interior threads to screw on the exterior threads of said teeth and having an opposed inclined surface to wedge against said inclined surface of said outer hub.

In testimony whereof I affix my signature, in the presence of two witnesses.

CHARLES S. ASH.

Witnesses:
J. R. WATSON,
H. E. VAN HORN.

It is hereby certified that in Letters Patent No. 1,314,381, granted August 26, 1919, upon the application of Charles S. Ash, of Geneva, New York, for an improvement in "Wire Wheels," an error appears in the printed specification requiring correction as follows: Page 2, line 86, claim 6, for the word "exterior" read *interior;* and that the said Letters Patent should be read with this correction therein that the same may conform to the record of the case in the Patent Office.

Signed and sealed this 7th day of October, A. D., 1919.

[SEAL.]

M. H. COULSTON,

*Acting Commissioner of Patents.*

Cl. 21—31.